US006944856B2

(12) United States Patent  
Taylor (10) Patent No.: US 6,944,856 B2  
(45) Date of Patent: *Sep. 13, 2005

(54) METHOD, SYSTEM, PROGRAM, AND DATA STRUCTURES FOR APPLYING A PATCH TO A COMPUTER SYSTEM

(75) Inventor: Julian S. Taylor, Nederland, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 617 days.

This patent is subject to a terminal disclaimer.

(21) Appl. No.: 09/851,923

(22) Filed: May 9, 2001

(65) Prior Publication Data

US 2004/0015949 A1 Jan. 22, 2004

(51) Int. Cl.[7] .......................... G06F 9/44; G06F 9/445
(52) U.S. Cl. .................. 717/171; 717/172; 717/173; 717/176; 717/177; 717/178
(58) Field of Search ................ 717/171, 172, 717/173, 176, 177, 178

(56) References Cited

U.S. PATENT DOCUMENTS

| | | | | |
|---|---|---|---|---|
| 5,930,513 A | * | 7/1999 | Taylor | 717/174 |
| 6,151,643 A | * | 11/2000 | Cheng et al. | 714/25 |
| 6,317,880 B1 | * | 11/2001 | Chamberlain et al. | 717/174 |
| 6,434,744 B1 | * | 8/2002 | Chamberlain et al. | 717/168 |
| 6,438,749 B1 | * | 8/2002 | Chamberlain | 717/174 |
| 6,493,871 B1 | * | 12/2002 | McGuire et al. | 717/173 |
| 2002/0174422 A1 | * | 11/2002 | Kelley et al. | 717/178 |

OTHER PUBLICATIONS

Bartoletti et al., "Secure Software Distribution System", Jun. 30, 1997, Computer Security Technology Center, Lawrence Livermore National Laboratory, pp. 1–10. [retrieved online on May 4, 2004, http://clac.llnl.gov/cstc/ssds/ssdswp.pdf].*
U.S. Appl. No. 09/852,113, filed on May 9, 2001, entitled, "Method, System, Program, And Data Structures For Using A Database To Apply Patches To A Computer System", invented by J.S. Taylor.
U.S. Appl. No. 09/852,070, filed on May 9, 2001, entitled, Method, System, And Program for Providing Patch Expressions Used In Determining Whether To Install A Patch, invented by D.K. Hiltgen and J.S. Taylor.
Indigo Rose Software Design Corp. "HOWTO: Detect a Previous Install Location and Use it as a Default Path for a New Install" from *Setup Factory 5.0* [online], Article ID: IRKB–SF5–000002, Nov. 9, 1999, pp. 1–5. [Retrieved on May 3, 2001]. Retrieved from the Internet at URL: <http://www.indigorose.com>.
Indigo Rose Software Design Corp. "Setup Factory 5.0 *User's Guide*" [online], Oct. 1999, pp. 1–67. [Retrieved on May 3, 2001]. Retrieved from the Internet at URL: <http://www.indigorose.com>.

* cited by examiner

*Primary Examiner*—Todd Ingberg  
*Assistant Examiner*—Qamrun Nahar  
(74) *Attorney, Agent, or Firm*—Lahive & Cockfield, LLP (57) ABSTRACT

Provided is a method, system, program, and data structure for applying a patch to a computer system, wherein the patch includes content to add to the computer. A computer object is generated to include configuration information on the determined installed components. At least one patch includes content to add to the computer and is capable of being associated with at least one realization, wherein each realization defines a state of the computer. For each realization, a determination is made from the configuration information in the computer object as to whether the state defined by the realization exists in the computer. Data is written to the computer object indicating whether the state defined by the realization exists on the computer. The computer object is used to determine whether each patch is compatible with the installed components of the computer.

58 Claims, 9 Drawing Sheets

Realization

FIG. 4

Realization List Entry

METHOD, SYSTEM, PROGRAM, AND DATA STRUCTURES FOR APPLYING A PATCH TO A COMPUTER SYSTEM

CROSS REFERENCE TO RELATED APPLICATIONS

This patent application is related to the following co-pending and commonly assigned patent applications filed on the same date herewith, and which are incorporated herein by reference in their entirety:

"Method, System, and Program for Providing Patch Expressions Used in Determining Whether to Install a Patch", filed on May 9, 2001, U.S. Ser. No. 09/852,070; and "Method, System, Program, and Data Structures For Using a Database to Apply Patches to a Computer System", filed on May 9, 2001, U.S. Ser. No. 09/852,113.

BACKGROUND OF THE INVENTION

1. Field of the Invention

The present invention relates to a method, system, program, and data structure for applying a patch to a computer system.

2. Description of the Related Art

In the prior art, to update or upgrade installed programs, a computer user would typically electronically access a vendor server site over a network, such as the Internet, and download the needed programs. Certain software vendors, such as Microsoft Corporation, provide an update program downloaded from Microsoft's web site that runs locally on the user computer, determines installed components, and presents updates the user may select to apply without transmitting any system information to Microsoft. The computer user may select suggested updates to download from the Microsoft web site. Such prior art techniques for locally analyzing the system and determining upgrades to apply are limited in that they perform only basic checking of installed components and require the execution of a program that interrogates system files each time updates are requested.

Moreover, prior art installation and updating programs, such as the Microsoft online update program and the Setup Factory installation program utilize commands and code that execute in the general operating system environment and are capable of accessing general system resources. Such an open architecture for applying updates and installations raises security concerns because the software vendor providing the update may inadvertently or malevolently access or modify system configuration information, data, and restricted data. Such security concerns are further heightened for update and installation packages provided by software vendors that are not known and trusted entities.
**Microsoft is a trademark of Microsoft Corporation.
**Setup Factory is a trademark of Indigo Rose Software Design Corporation.

Software vendors also make updates and fixes available through their web sites. The user typically accesses the software vendor's web site and then will attempt to ascertain what fixes and updates are needed by reading documentation on the web site. In such cases, the application of updates is based on the specific knowledge of the user of the host computer, which in many cases may be inadequate to correctly determine and select the appropriate updates and fixes to apply given the current system status.

For these reasons, there is a need in the art to provide improved techniques for determining system configuration information and applying program fixes and updates to the system.

SUMMARY OF THE PREFERRED EMBODIMENTS

Provided is a method, system, program, and data structure for applying a patch to a computer system, wherein the patch includes content to add to the computer. A computer object is generated to include configuration information on the determined installed components. At least one patch includes content to add to the computer and is capable of being associated with at least one realization, wherein each realization defines a state of the computer. For each realization, a determination is made from the configuration information in the computer object as to whether the state defined by the realization exists in the computer. Data is written to the computer object indicating whether the state defined by the realization exists on the computer. The computer object is used to determine whether each patch is compatible with the installed components of the computer.

Further, the patch content to add to the computer may comprise a new program, an upgrade to an installed program, a fix to an installed program, documentation, etc.

In further implementations, writing data to the computer object indicating that the state exists comprises indicating in the computer object that the state defined by the realization exists in the computer if the state exists on the computer or indicating in the computer object that the state defined by the realization does not exist on the computer if the state does not exist on the computer.

Further, the patch may be associated with a patch expression that is capable of processing configuration information and realizations in the computer objects to determine whether to install the patch code on the computer.

Moreover, the steps of reading and writing performed as part of adding content to the computer may be restricted to reading and writing from the computer object on the computer.

BRIEF DESCRIPTION OF THE DRAWINGS

Referring now to the drawings in which like reference numbers represents corresponding parts throughout.

DETAILED DESCRIPTION OF THE DESCRIBED IMPLEMENTATIONS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
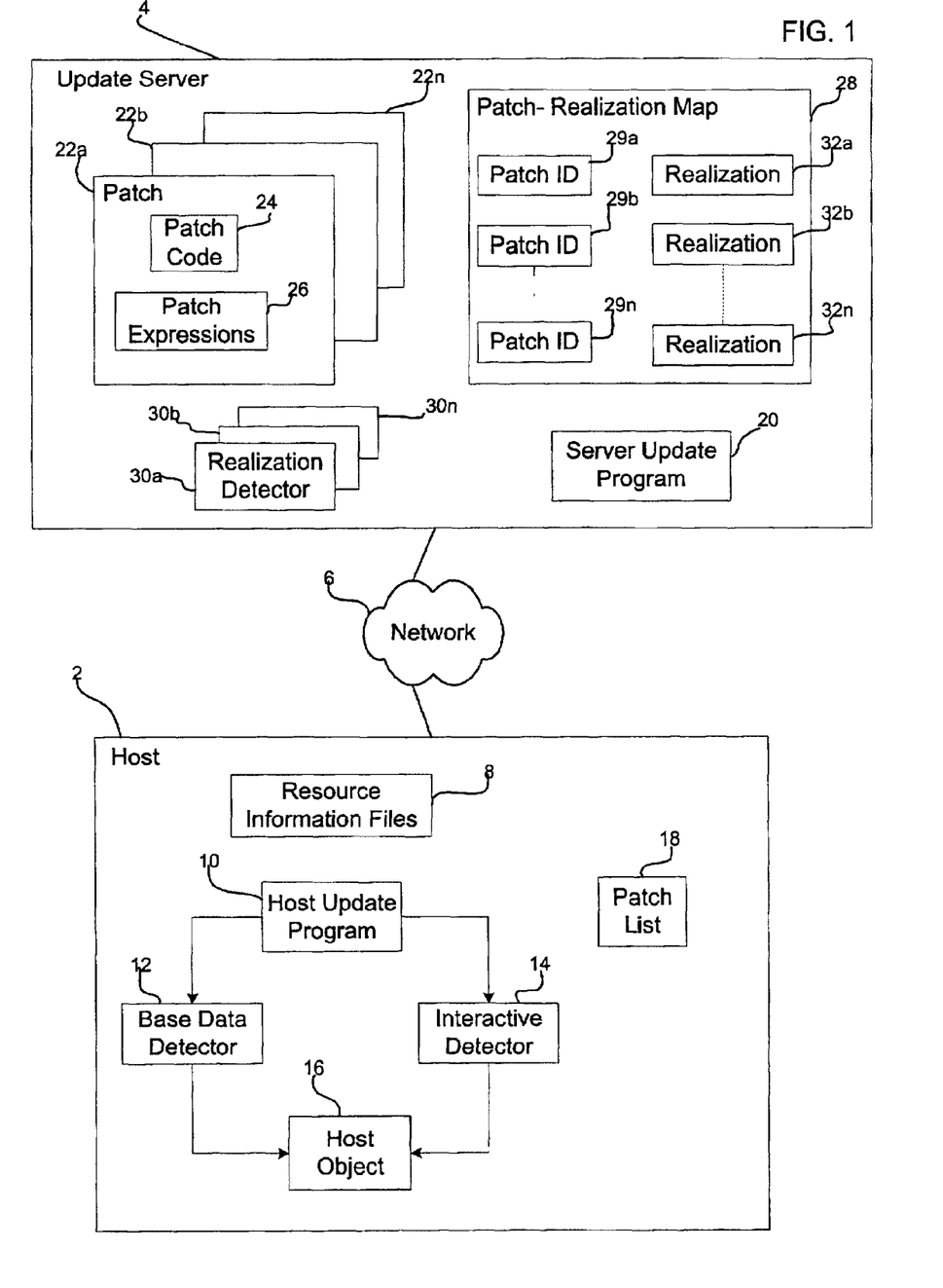
FIG. 1 illustrates a computer architecture in which aspects of the invention are implemented.

FIG. 1 illustrates a network computing environment in which aspects of the invention are implemented. A host computer 2 and server computer 4 communicate over a network 6, such as a Local Area Network (LAN), Wide Area Network (WAN), the Internet, an Intranet, etc., using any network protocol known in the art, e.g., Ethernet, Fibre Channel, TCP/IP, HyperText Transfer Protocol (HTTP), File Transfer Protocol (FTP), etc. The host 2 includes one or more resource information files 8 that provide tables, databases or other data structures providing information on installed system hardware and software resources, such as registry files or any other files. The host 2 further includes a host update program 10 that includes program code and modules to handle the update related operations in the host 2, including the base data detector 12 and interactive detector 14 that interrogate and determine host configuration information to use when generating a host object 16 that provides information on installed software packages, applied patches, firmware revisions, and any other software and/or hardware resource configuration on the host 2.

The server 4 includes a server update program 20 that handles requests for updates from the host 2 and a plurality of patches 22a, b . . . n. Each patch 22a, b . . . n includes patch code 24, which comprises the update or program fix to add to software or firmware installed on the host 2 or on a device attached to the host, e.g., a disk drive, tape drive, etc. An upgrade is an installation that changes the version number of the product, which often involves adding functionality to the program. A fix (also known as an update) comprises one or more software modules to add to an installed software program that does not add or remove any functionality, but merely fixes a known problem or bug. Additionally, the patch 22a, b . . . n may provide any other types of content to add to the host 2, such as new program installations or documentation. Each patch 22a, b . . . n also includes one or more patch expressions 26 of script commands executed by the host update program 10 to evaluate certain conditions in the host object 16 and determine whether or in what manner the patch code 24 for the patch 22a, b . . . n is capable of being applied to the host 2 given the information on the host configuration maintained in the host object 16. Further details of the structure of the patch expressions 26 are described in the related application entitled "Method, System, and Program for Providing Patch Expressions Used in Determining Whether to Install a Patch", having Ser. No. 09/85,070, and which was incorporated herein by reference above.

The update server 4 further includes a patch-realization map 28 indicating how realizations are associated with the patches 22a, b . . . n. The map 28 provides an association of unique patch identifiers (IDs) 29a, b . . . n of the patches 22a, b . . . n and realizations 32a, b . . . n, which may have a many-to-may relationship. The map 28 may be implemented as a table of associations or as one or more database tables. A realization 32a, b . . . n, described below, is a data structure indicating a particular host state. For instance, if the patch 22a, b . . . n is used to fix a known bug, then the realizations 32a, b . . . n associated with that patch 22a, b . . . n in the patch-realization map 28 would indicate the state corrected by the patch 22a, b . . . n. The update server 4 also includes one or more realization detectors 30a, b . . . n that are downloaded to the host 2 to write realizations 30a, b . . . n to the host object 16

Figure 2:
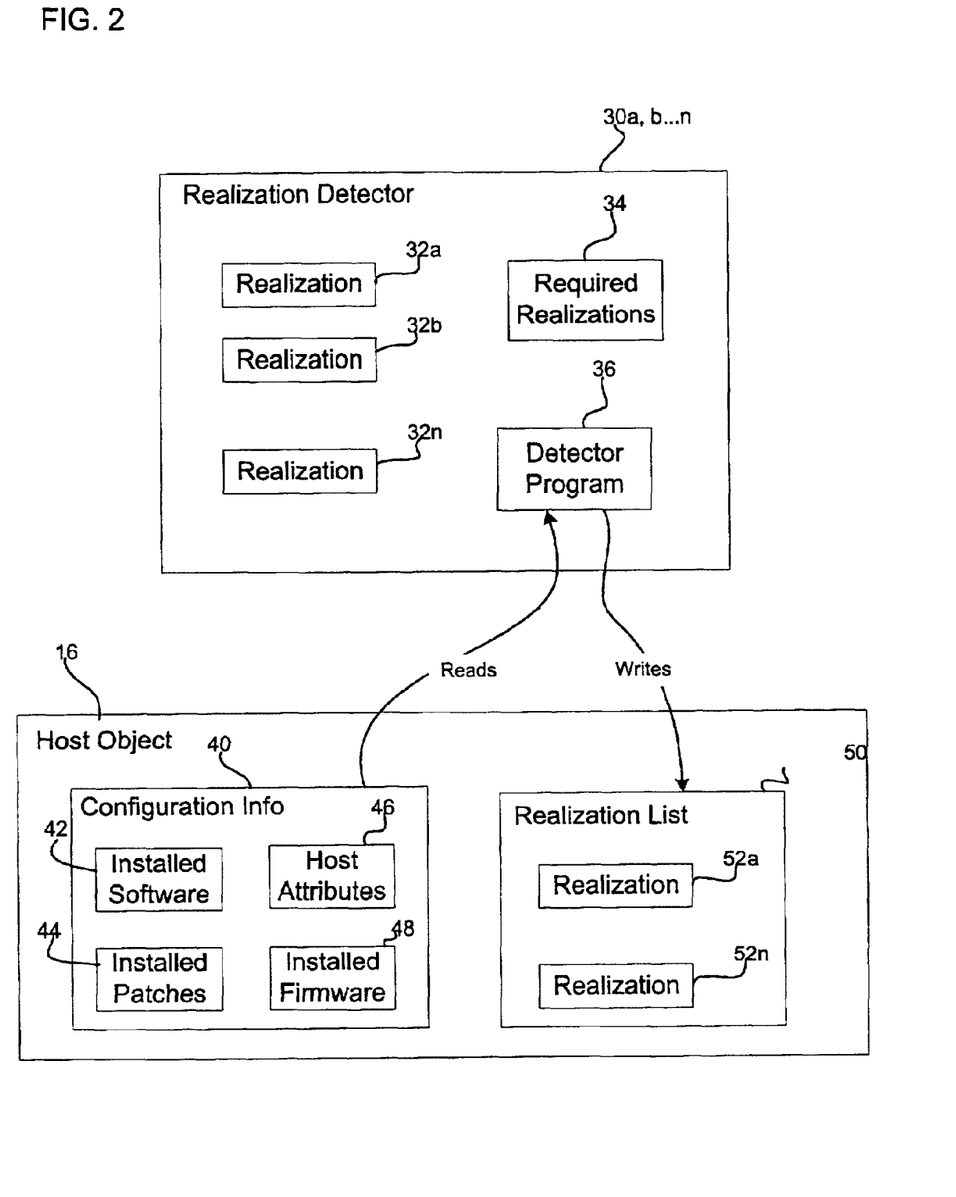
FIG. 2 illustrates components within a realization detector and the host object, and their interaction, in accordance with certain implementations of the invention.

FIG. 2 illustrates how the realization detectors 30a, b . . . n interact with the host object 16. The realization detectors 30a, b . . . n are capable of identifying one or more realizations 32a, b . . . n that are associated with one or more of the patches 22a, b . . . n according to the patch-realization map 28. The realizations 32a, b . . . n comprise registered well-defined versioned strings, each of which identifies a specific state of the host system 2, such as the presence of one or more hardware and/or software resource. Thus, a realization 32a, b . . . n is associated with a particular state of the host 2. The realization detectors 30a, b . . . n further include a required realization variable 34 indicating the realization name and version number of base realizations in other realization detectors 30a, b . . . n that must be verified in the host object 16 in order for the dependent realization detector 32a, b . . . n to complete. Thus, a dependent realization 32a, b . . . n requires the presence of one or more base realizations in the host object 16, placed there by the execution of a previous realization detector 30a, b . . . n. Moreover, the realizations 32a, b . . . n within one realization detector 30a, b . . . n may be organized in an order such that any realizations dependent on a base realization 32a, b . . . n within the same realization detector 30a, b . . . n are processed after the base realizations from which they depend. Still further, the realization detectors 30a, b . . . n may be organized so that those detectors 30a, b . . . n including base realizations 32a, b . . . n are processed before realization detectors 30a, b . . . n including realizations 32a, b . . . n dependent therefrom. The realization detectors 30a, b . . . n include a detector program 36 that executes on the host 2 and analyzes information in the host object 16 to determine whether the state associated with the realizations 32a, b . . . n exists on the host 2.

FIG. 2 illustrates that the host object 16 includes configuration information 40, written by the base data detector 12 and/or interactive detector 14, such as information on installed software 42, installed patches 44, host attributes 46 (e.g., host 2 architecture, operating system, manufacturer, directly attached devices, etc.), and installed firmware 48. The detector program 36 reads the configuration information 40 and based thereon writes any number or no realizations 32a, b . . . n associated with the realization detector 30a, b . . . n to the host object 16. The host object 16 further includes a host realization list 50 of realization entries 52a, b . . . n written by the detector program 36, indicating realization states detected on the host 2. When determining whether the state associated with a realization 32a, b . . . n exists in the host 2, the detector program 36 may consider configuration information 40 and/or realizations 32a, b . . . n previously written to the host object 16 realization list 50

Figure 3:
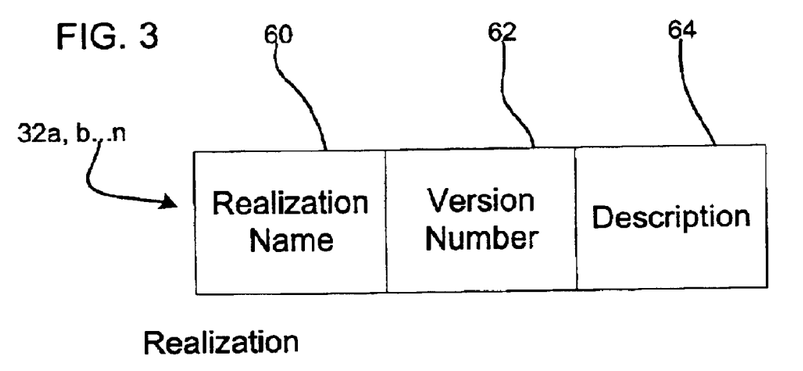
FIG. 3 illustrates a data structure of a realization in accordance with certain implementations of the invention.

FIG. 3 illustrates the fields in the realizations 32a, b . . . n maintained in the patch-realization map 28, which associates patch IDs 29a, b . . . n with realizations 32a, b . . . n. The realizations 32a, b . . . n in the patch-realization map 28 include:

Realization name 60: comprises a unique identifier for a particular realization 30a, b . . . n.

Version number 62: indicates a version of a particular realization. As new versions of realizations are released, the version number is incremented indicating the number of version changes.

Description 64: provides a brief free format description of the realization or state being checked, e.g., a couple of hundred ASCII characters.

Figure 4:
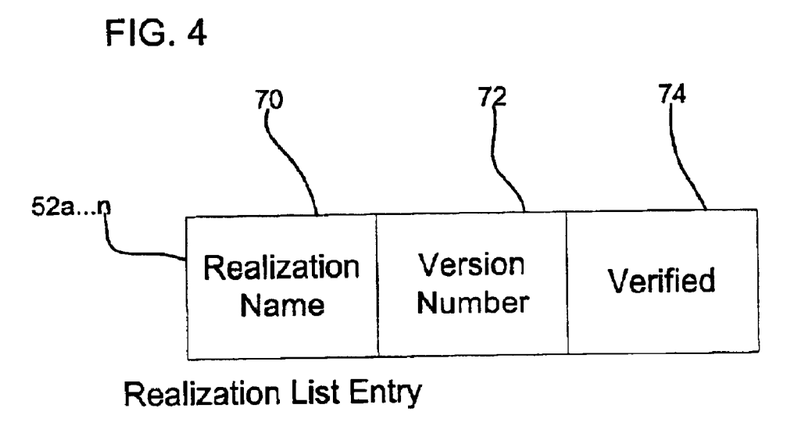
FIG. 4 illustrates a data structure of an entry in a realization list in the host object in accordance with certain implementations of the invention.

FIG. 4 illustrates the format of realization entries 52a, b . . . n in the host realization list 50 in the host object 16 written by the detector programs 36, including the realization name 70 and version number 72, which would be the realization name 60 and version number 62 maintained in the realizations 32*a*, *b* . . . *n* in the patch-realization map 28. A realization list entry 52*a*, *b* . . . *n* further includes a verified flag 74 indicating whether the detector program 36 returned true for the checked realization, i.e., the state checked by the detector program 36 exists in the host object 16, or false, i.e., the state does not exist in the host 2 according to information in the host object 16.

The detector program 36 may include one or more of the following methods that query the host object 16 for information on the availability of particular configuration information 40 and realizations:

isOperatingSystem: returns true if the target host 2 operating system as indicated in the host object 16 is the same as the specified operating system (OS), else returns false.

isOSRelease: returns true if the target host 2 operating system as indicated in the host object 16 is of the specified release, else returns false.

isPlatform: returns true if the target host 2 hardware platform as indicated in the host object 16 is the same as the specified platform, else returns false.

isArchitecture: returns true if the target host 2 processor architecture as indicated in the host object 16 is the same as the specified processor architecture, else returns false.

verifyRealization: verifies that the verified flag 56 (FIG. 5) in a realization entry 60 in the realization list 52 is true, i.e, the state checked by the realization exists on the host 2.

hasExactRealization: returns true if the target host object 16 has a realization 30*a*, *b* . . . *n* in the realization 52 list having same realization name 50 and same version number 42 as specified realization.

hasRealization: returns true if the target host object 16 has a realization 30*a*, *b* . . . *n* in the realization 52 list having same realization name 50 and same or newer version number 42 as specified realization.

hasExactSoftwarePackage: returns true if the target host object 16 has an installed software package having the same name and version number as specified software package.

hasSoftwarePackage: returns true if the target host object 16 has an installed software package having the same name and a same or newer version number as specified software package.

hasExactPatchID: returns true if the target host object 16 has an installed patch having the same name and a same version number as specified patch ID.

hasPatchID: returns true if the target host object 16 has an installed patch having the same name and a same or newer version number as specified patch ID.

The detector program 36 may include combinations of one or more of the above methods to determine a state of the host 2 with respect to installed hardware and software components from the configuration information 40 and realization entries 52*a*, *b* . . . *n* included in the host realization list 52. The state determined by the detector program 36 may indicate whether an update is not likely to operate on the host 2 system. Additionally, when the patch code 24 comprises a fix, such as code to eliminate a bug, the state determined by the detector program 36 may indicate whether the configuration of the host 2 is particularly susceptible to the bug the patch code 24 is intended to fix.

Figure 5:
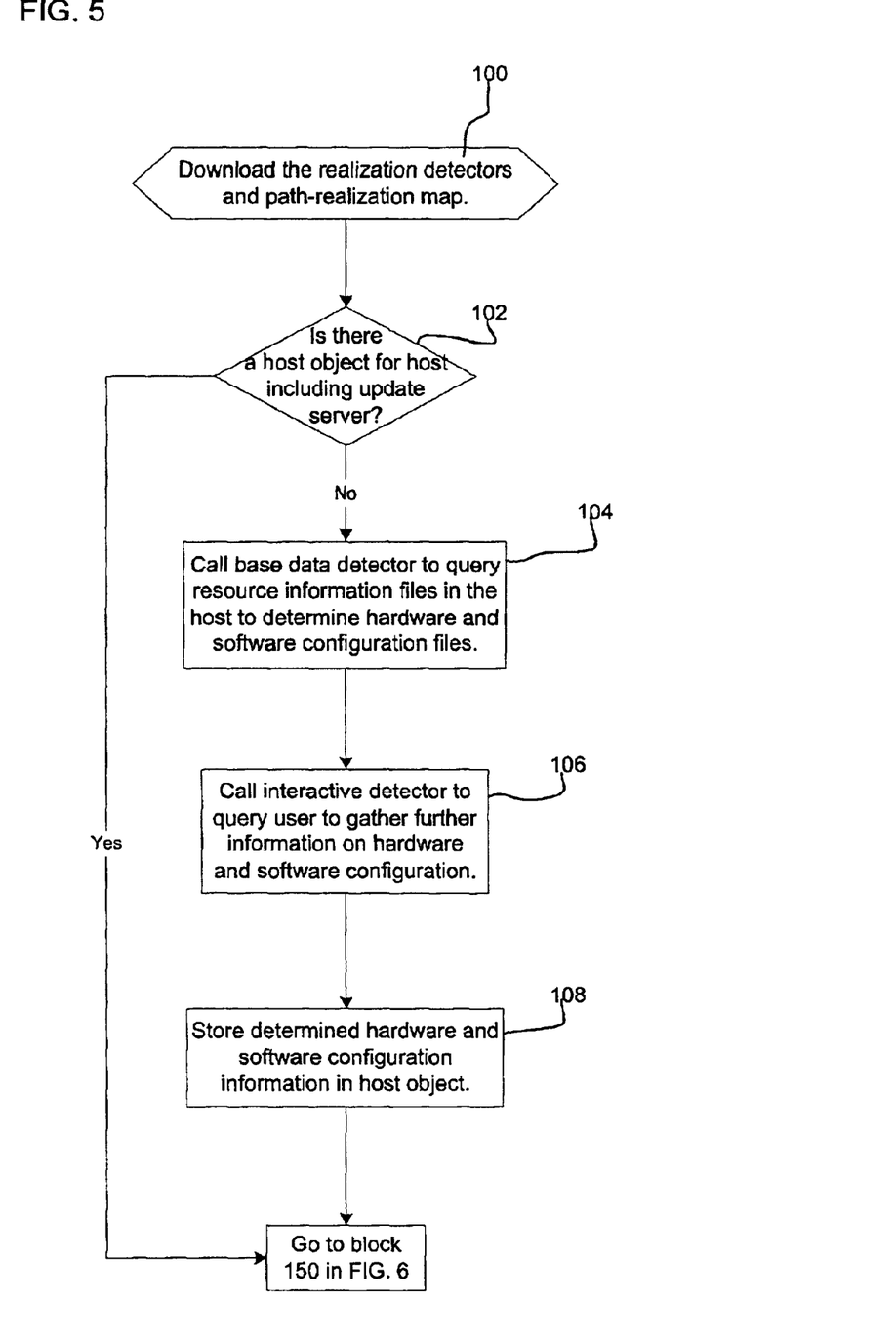
FIGS. 5, 6, 7a, 7b, and 8 illustrate logic to apply code from patches to a host system in accordance with certain implementations of the invention.

FIG. 5 illustrates logic executed in the host update program 10 to construct a host object 16 that defines the hardware and software configuration of the host 2. Control begins at block 100 with the host update program 10 downloading the patch-realization map 28 identifying patches 22*a*, *b* . . . *n* and one or more associated realizations 32*a*, *b* . . . *n* and the realization detectors 30*a*, *b* . . . *n*. If (at block 102) there already exists a host object 16 for the host 2, then control proceeds to block 150 in FIG. 6; otherwise, the host update program 10 calls (at block 104) the base data detector 12 to query the resource information files 8 to determine the software and hardware configuration existing on the host 2. The host update program 10 may further call (at block 104) the interactive detector 14 to present the user with questions regarding otherwise undetectable software and hardware configurations. Through this user interface the user may select to specify the configuration of the host 2. For instance, the user interface may display check boxes and/or drop down menus of different hardware and software configuration components which the user may select to define the hardware and software configuration of the host 2 system. The determined or entered software and hardware configuration information is then stored in the host object 16 with the configuration information 40. In certain embodiments, the host update program 10 may only call the base data detector 12 to initialize the host object 16. Alternatively, the host update program 10 may only call the interactive detector 14 to initialize the host object 16 with hardware and/or software configuration information entered by the user through a user interface. Still further, both the base data detector 12 and interactive detector 14 may be called to both provide hardware and software configuration information to the host object 16.

Figure 6:
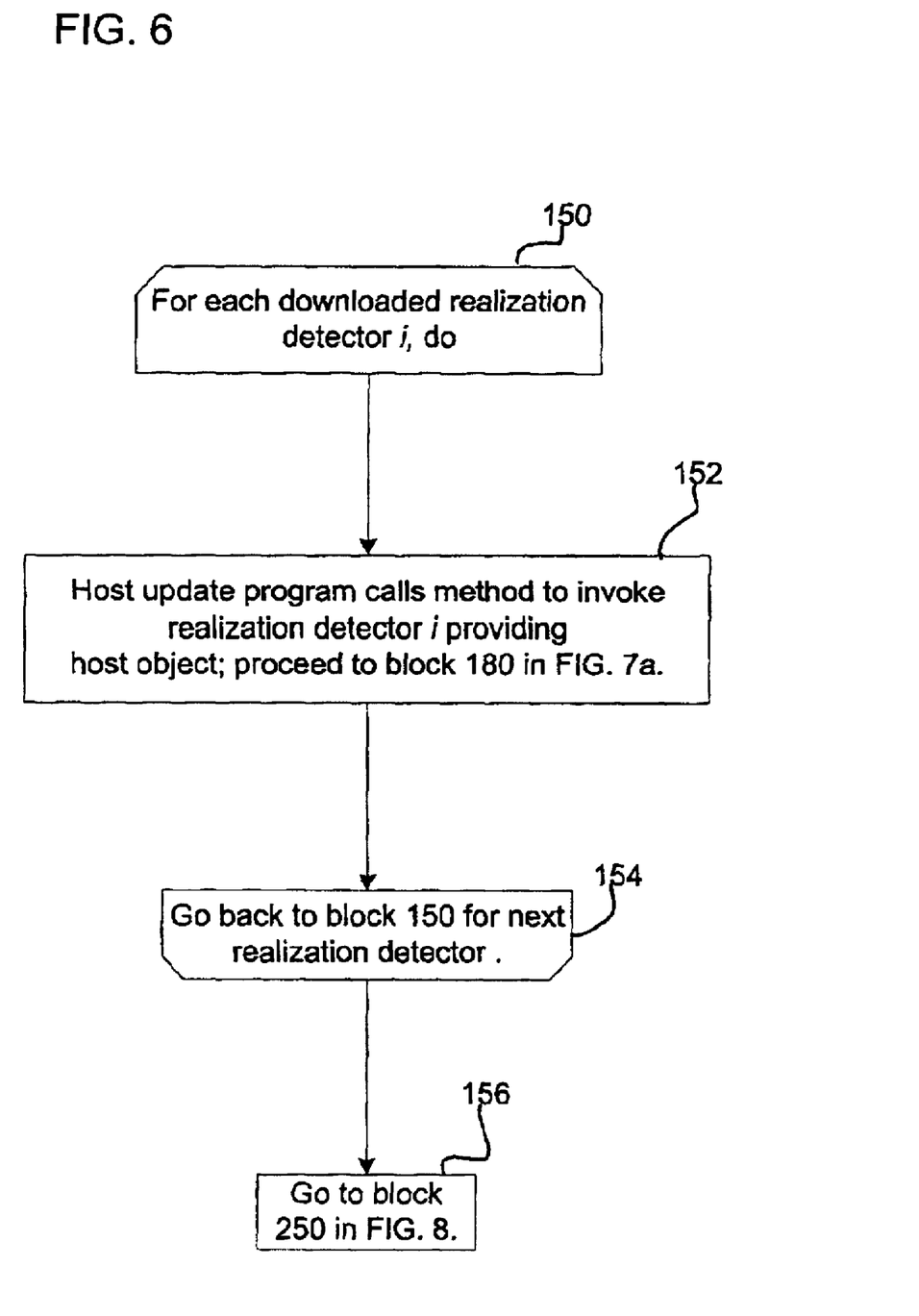
Figure 7A:
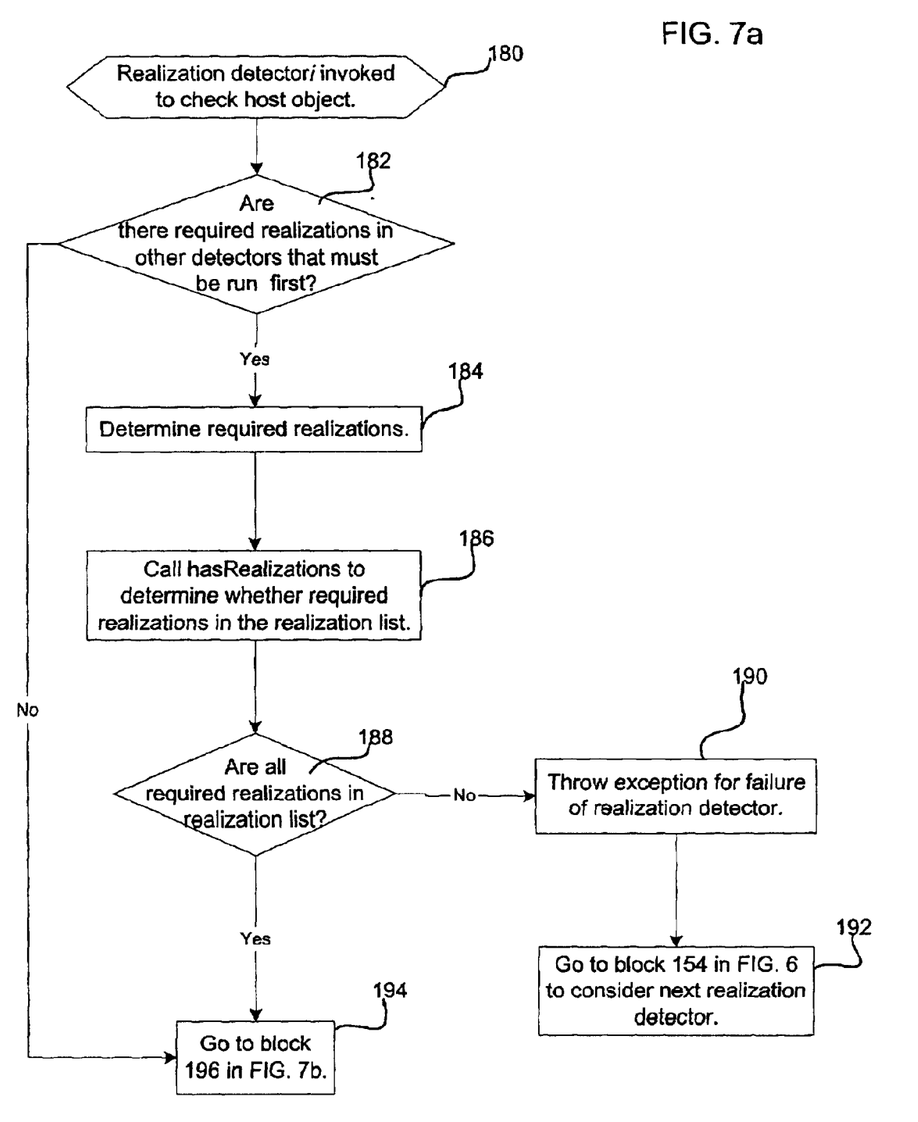
Figure 8:
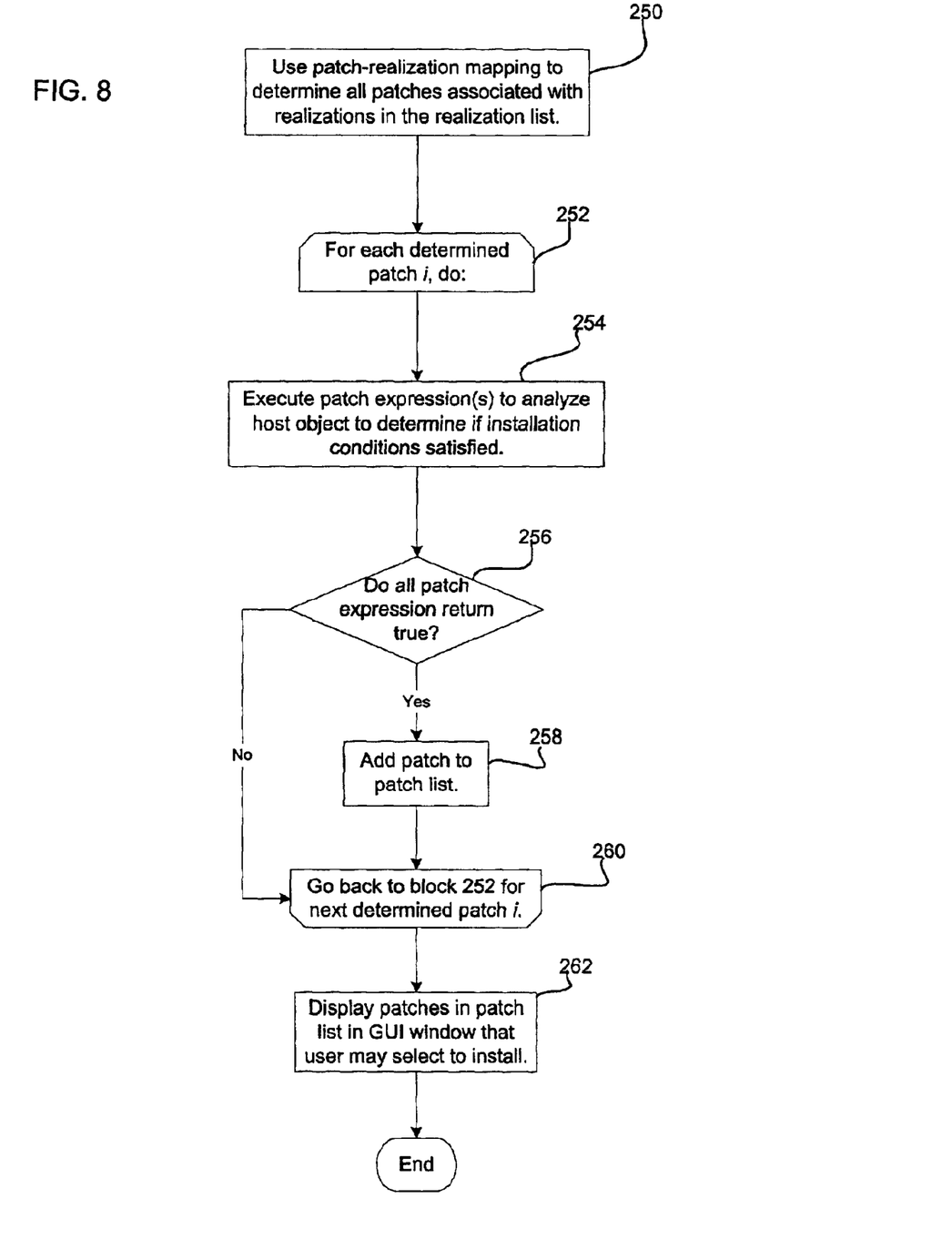

FIGS. 6 and 8 illustrate logic implemented in the host update program 10 to call the realization detectors 30*a*, *b* . . . *n* to determine patches that can be applied to the host 2. Once the host object 16 is initialized with configuration information from the base data detector 12 and/or interactive detector 14, control proceeds to block 150 in FIG. 6 where the host update program 10 performs a loop at blocks 150 to 154 for each downloaded realization detector i. At block 152, the host update program 10 calls a method to invoke the realization detector i providing the host object 16. Control then proceeds to block 180 in FIG. 7*a*.

Figure 7B:
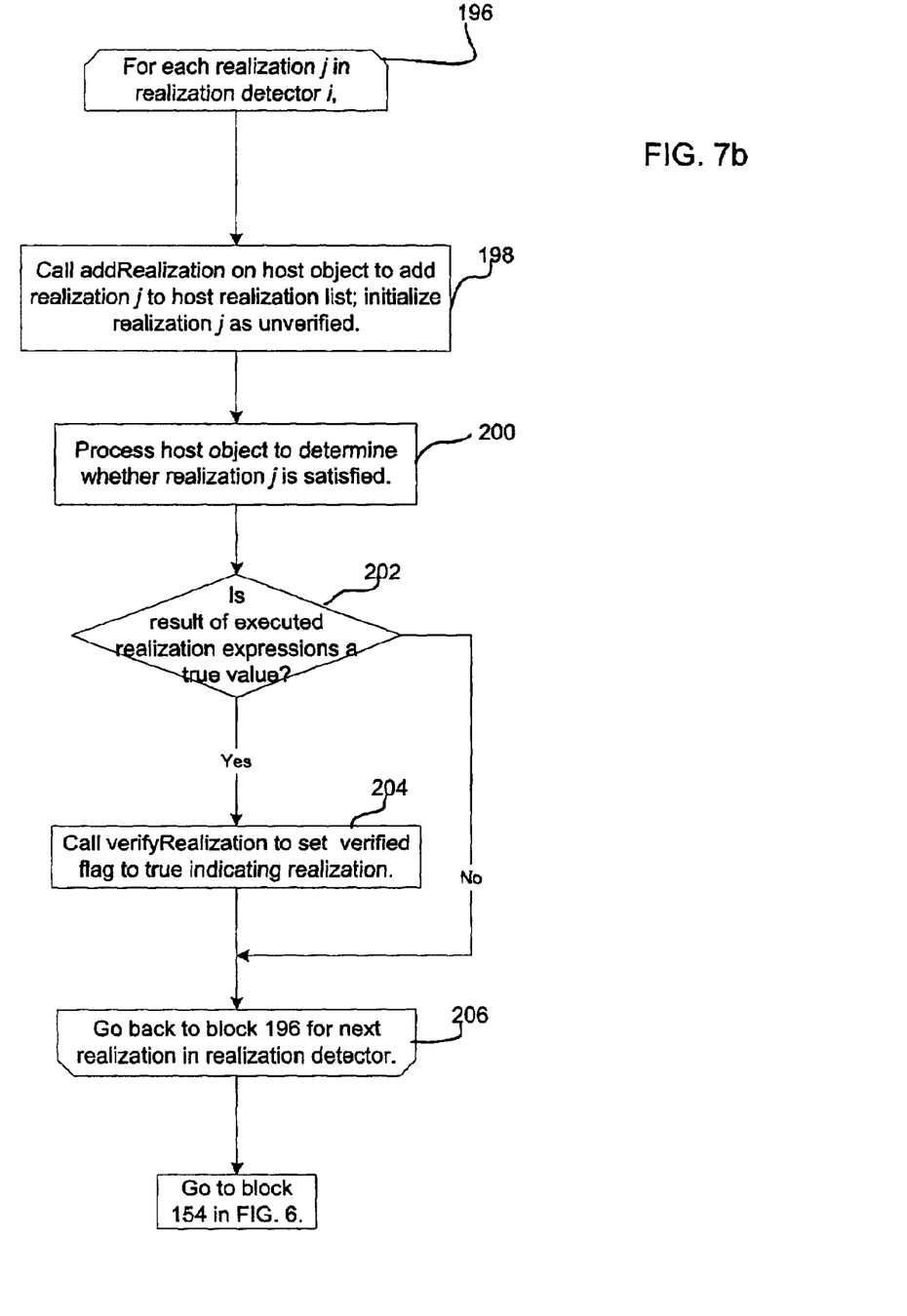

FIGS. 7*a*, *b* illustrate logic implemented in the detector program 36 to verify the presence of states defined by realizations 32*a*, *b* . . . *n* associated with the realization detector i. At block 180 in FIG. 7*a*, the realization detector i is invoked by the host update program 10 to perform blocks 182 through 206 to execute the one or more realizations 30*a*, *b* . . . *n* within the realization detector i. The detector program 36 calls a method, hasRealizations, to determine (at block 182) whether there are any required realizations 34 (FIG. 2) that must be included in the host realization list 50 by other realization detectors 30*a*, *b* . . . *n* in order for the realization detector i to determine its own realizations 32*a*, *b* . . . *n*. If there are required realization 34, then the detector program determines (at block 184) the required realizations and calls (at block 186) the method hasRealizations to determine whether the required realizations are in the realization list 50 of the host object 2. If (at block 188) all the required realizations 52*a*, *b* . . . *n* are in the host realization list 50 or if there are no required realizations, then control proceeds (at block 194) to block 196 in FIG. 7*b* where the detector program 36 performs a loop of steps 198 to 204 for each realization j checked by the realization detector i to register the realizations 32*a*, *b* . . . *n* with the host object 16.

At block 198, the detector program 36 calls the addRealization on the host object 16 to add realization j to the host object 16 and initialize the realization j as unverified, i.e., sets the verified flag 74 (FIG. 4) to false. The detector program 36 then processes (at block 200) the host object 16 to determine whether the realization j is satisfied, i.e., the state defined by the realization j exists in the host 2. The detector program 36 may determine whether certain hardware and/or software components are installed as indicated in the configuration information 40 (FIG. 2) and/or consider status of realizations 52a, b . . . n already registered in the realization list 50. If (at block 202) the result of the realization j is verified, then the detector program 36 calls (at block 204) the verifyRealization method to set the verified flag 74 for the realization j in the realization list 50 to true; otherwise, the verified flag 74 remains false. From block 202 or 204, control proceeds (at block 206) back to block 296 to consider the next realization 32a, b . . . n in the realization detector i until all realizations are processed. After all realizations 32a, b . . . n for the realization detector i are considered, control proceeds (at block 208) to back to block 154 in FIG. 6 to process the next downloaded realization detector 30a, b . . . n.

If (at block 188) the realization list 50 did not include all required realizations, then the detector program 36 would throw (at block 190) an exception indicating a failure of the realization detector i. From block 190 or 204, control proceeds (at block 192) back to block 154 in FIG. 6 to consider the next downloaded realization detector i. After processing (at block 154) all the downloaded realization detectors 30a, b . . . n, control proceeds (at block 156 in FIG. 6) to block 250 in FIG. 8.

FIG. 8 illustrates logic implemented in the host update program 10 to generate a patch list 18 which comprises the patches to present to the user for selection to install on the host 2. At block 250, the host update program 10 uses the patch realization mapping 28 to determine all patch IDs 29a, b . . . n associated with realizations 32a, b . . . n written to the host realization list 50 after processing the downloaded realization detectors 30a, b . . . n. A loop is performed at block 252 to 262. At block 254, the host update program 10 executes the patch expression(s) 26 to analyze the host object 16 to determine whether the host 2 includes specified software and/or hardware components and/or whether specific realizations 52a, b . . . n in the realization list 50 have been verified. If (at block 254) the patch expression 28 returns true, then the host update program 10 adds (at block 256) the patch i to the patch list. From block 258 or the no branch of block 256, if the patch expression returns false, i.e., the patch expression 28 conditions are not satisfied, control proceeds (at block 260) back to block 252 to consider the next downloaded patch 22a, b . . . n.

After all patches have been considered, the host update program 10 displays a user interface listing all the patches in the patch list to allow the user to select one or more patches 22a, b . . . n from the patch list to install by executing the patch code 24 for such selected patches 22a, b . . . n. The host update program 10 may download the patch code 24 for the patches 22a, b . . . n selected from the patch list 18 to conserve network bandwidth because only the patch code for user selected patches 22a, b . . . n are downloaded and installed.

The architecture described herein allows software vendors who provide patches for their installed products to make patches available on an update server 4. The described implementations provide a technique where the patch itself is able to determine whether the patch installation is compatible with the host 2 configuration. The realization detectors 30a, b . . . n are able to verify the capabilities of the host 2 indirectly through a host object 16. In certain described implementations, the only modification the detector programs 36 included with the realization detector 30a, b . . . n may make is to write verification information to the realization list 52 in the host object 16. These restrictions on the access provided to the realization detectors 30a, b . . . n protects the host system 2 from the realization detector 30a, b . . . n inadvertently or malevolently performing harmful operations on the host system 2.

In the above described implementations, the realization detectors 30a, b . . . n are downloaded and executed on the host 2 on which the patches 22a, b . . . n will be applied. The host update program 10 may comprise a program the host 2 temporarily downloads, such as a Java Applet\*\*, to generate the host object 16 and determine patches 22a, b . . . n that may be applied. Additionally, the host update program 10 may comprise a stand alone program permanently installed on the host 2 that periodically checks the update server 4 for new patches 22a, b . . . n to present to the user to enable the host 2 user to apply the new patches 22a, b . . . n.

\*\*Java is a trademark of Sun Microsystems, Inc.

Figure 9:
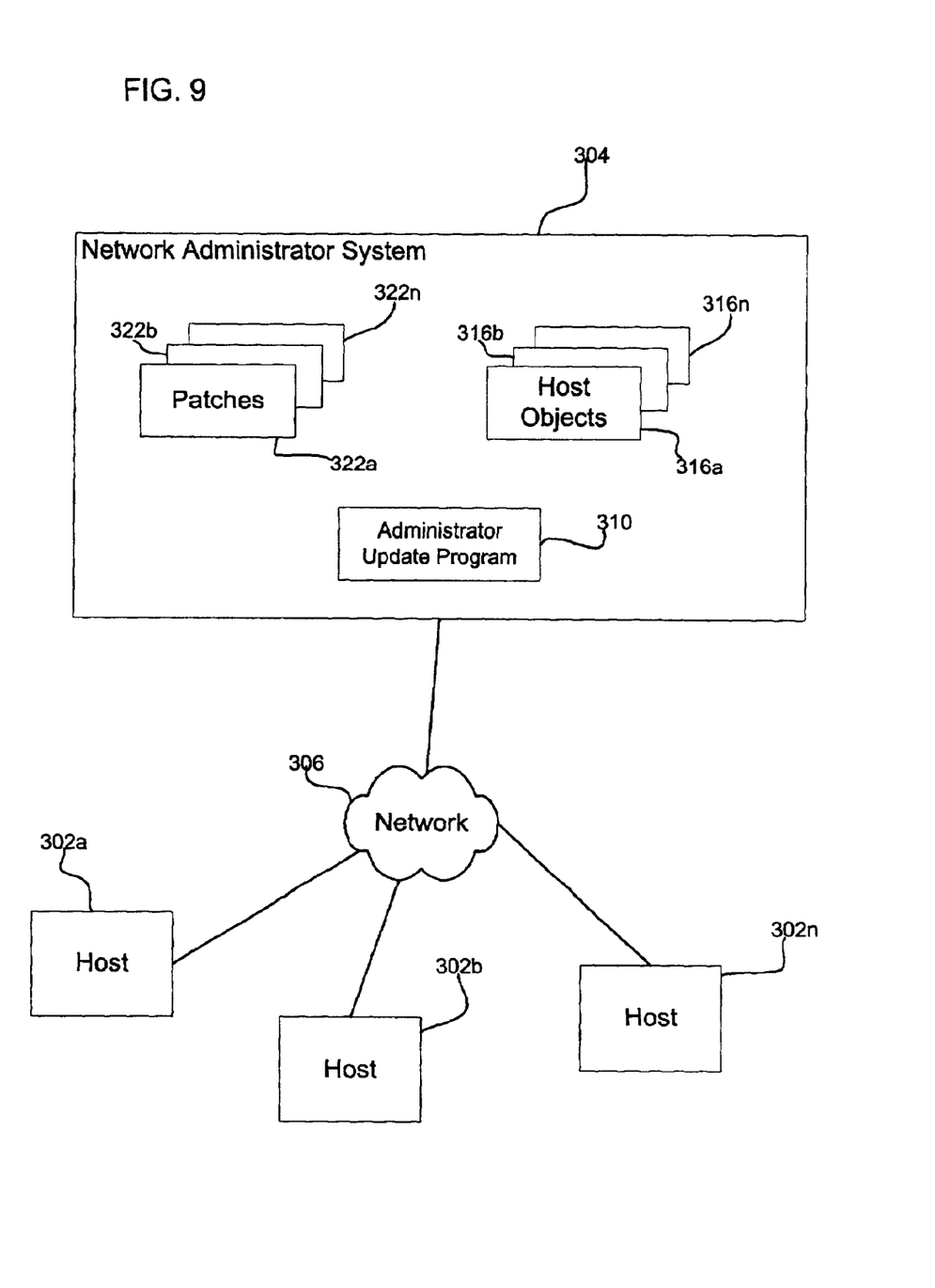
FIG. 9 illustrates a network computer architecture in which aspects of the invention are implemented.

FIG. 9 illustrates an additional implementation in which multiple hosts 302a, b . . . n are managed by a network administrator system 304. In such implementations, the network administrator system 304 would maintain host objects 316a, b . . . n for each host 302a, b . . . n, respectively, managed by the network administrator 304 over the network 306. The network administrator 304 may have initialized the host objects 316a, b . . . n using the base data detector 12 which runs locally on the hosts 302a, b . . . n and/or the interactive detector 14. With respect to the interactive detector 14, the network administrator may use the interactive detector 14 to specify the configuration of the hosts 302a, b . . . n in the network 306.

The network administrator may run an administrator update program 310 to download or otherwise access patches 322a, b . . . n and their realization detectors, and then run the detector programs in the downloaded realization detectors to determine the patches that may be applied to the hosts 302a, b . . . n on the network 306. The network administrator, using the network update program 310, may then select which compatible patches to apply to the hosts 302a, b . . . n in the network. Additionally, the network administrator may maintain all hosts 302a, b . . . n with the same configuration. In such case, network administrator selection of patches to apply may cause the network update program 310 to apply the selected patches to all the hosts 302a, b . . . n in the network 302 represented by a host object 316a, b . . . n in the network administrator system 304.

With the network implementation described with respect to FIG. 10, the network administrator does not have to interrogate or query the different hosts 302a, b . . . n, and may instead determine patches to apply using only the host objects 316a, b . . . n. In this way, the described implementations provide a tool to facilitate the application of patches to multiple hosts 302a, b . . . n managed by a common network administrator.

ADDITIONAL IMPLEMENTATION DETAILS

The described implementations may comprise a method, apparatus, program or article of manufacture using standard programming and/or engineering techniques to produce software, firmware, hardware, or any combination thereof. The programs defining the functions of the described implementations can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative implementations of the present invention.

In the described implementations, the host 2 and update server 4 comprised separate computer systems. In alternative implementations, the host and update server may comprise program entities implemented on the same computer platform.

In certain implementations, the update programs, realization detectors, and realization routines are implemented in an object oriented programming language, such as Java, C++, etc. Alternatively, the programs and code described herein may be implemented in a non-object oriented programming language.

The host 2 and update server 4 may use any communication or messaging protocol known in the art to communicate.

In the described implementations, one host object 16 maintained all the information on available hardware and software resources 50 and the realization list 52 (FIG. 4). Alternatively, such information may be distributed across multiple data objects maintained for the host 2.

In the described implementations, realizations 32*a*, *b* . . . *n* were added to the host realization list 50 in response to the detector program 36 verifying a state for the host 2 based on configuration information 40 in the host object 16. In alternative implementations, the host update program 10 may generate a user interface display in which the user selects particular configuration options. A Java Servlet, or other program, may maintain an association of the configuration options in the user interface and realization. Upon receiving user selection of configuration options, the Servlet would then add the associated realizations to the host realization list 50 in the host object 16. In this way, realizations are added to the host object 16 through a user interface.

In the described implementations, the host update program executed the realization detectors and determined patches to apply to the host computer locally. Alternatively, the host object 16 defining the host system 2 may be generated at another computer remotely where the realization detectors execute to determine remotely patches that can be applied to the host system 2. In such implementations, the host objects may be generated using the interactive detector 14 where a user at the remote system enters information on the hardware and software configuration to generate the host object 16.

The described implementations were used to determine patches of code that may be applied to already installed software or firmware components. Additionally, the above technique for determining the suitability of patches to apply may be used to determine the suitability of installing an entirely new program on the system or installing additional documentation. Accordingly, the term "patch" as used herein may apply to updating the host 2 with any program or data, such as updates, upgrades, fixes, new installations, documentation, etc.

Host objects 16 may be maintained and used for numerous patch installations or regenerated each time the host update program 10 is provided a group of patches to install.

In the described implementations, the detector programs 36 included in the realization detectors 26*a*, *b* . . . *n* are not allowed to write to any other parts of the host 2 outside of writing verification information to the host object 16. In alternative implementations, the realization detectors 26*a*, *b* . . . *n* may be provided access to other parts of the host 2. The described logic of FIGS. 5–8 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A method for applying a patch to a computer system, wherein the patch includes content to add to the computer, comprising:

determining at least one of installed hardware and software components on the computer;

generating a computer object including configuration information on the determined installed components;

providing at least one patch including content to add to the computer, wherein each patch is capable of being associated with at least one realization, wherein each realization defines a state of the computer, for each realization, downloading a realization detector to the computer system, each realization detector determining from the configuration information in the computer object whether the state defined by the realization exists in the computer.

writing data to the computer object indicating whether the state defined by the realization exists on the computer; and using the computer object to determine whether each patch is compatible with the installed components of the computer.

2. The method of claim 1, wherein the patch content to add to the computer is capable of comprising one of: a new program; an upgrade to an installed program; a fix to an installed program; and documentation.

3. The method of claim 1, wherein one realization is capable of being dependent on another realization in the computer object, further comprising:

determining whether the realization is dependent on at least one base realization; and if the realization is dependent on at least one base realization, performing:
(i) determining whether the computer object includes information on the base realizations; and
(ii) if the computer object does not include information on the base realizations, then throwing an exception.

4. The method of claim 3, further comprising:
in response to throwing the exception, preventing each patch associated with at least one realization dependent from the base realization not written to the computer object from being installed.

5. The method of claim 1, wherein writing data to the computer object indicating that the state exists comprises:
indicating in the computer object that the state defined by the realization exists in the computer if the state exists on the computer; and
indicating in the computer object that the state defined by the realization does not exist on the computer if the grate does not exist on the computer.

6. The method of claim 1, wherein determining from the computer object whether the state exists on the computer includes determining whether information on one previously considered realization is written to the computer object.

7. The method of claim 1, wherein each patch is further associated with a patch expression that is capable of processing the computer object to determine whether to add the content from the patch onto the computer.

8. The method of claim 1, wherein each realization detector includes detector code to determine whether states defined by realizations exist on the computer and to write data to the computer object concerning the existence of the determined states.

9. The method of claim 1, further comprising:
downloading a plurality of patches to the computer, each including content to add to the computer, wherein the steps of executing a realization routine, writing data to the computer object, and using the computer object to determine whether the patch is compatible with the installed components of the computer is performed on the computer.

10. The method of claim 9, further comprising:
generating a list of all patches determined to be compatible with the installed components of the computer; and
rendering the list of patches on an output device to enable a user to select the content of one or more of the patches on the list to add to the computer.

11. The method of claim 1, further comprising:
maintaining, at a network administration system, a plurality of computer objects associated with a plurality of computers on a network, wherein each computer object includes the configuration information on the determined installed components of one computer on the network, and wherein the steps of determining whether the state defined by the realization exists on the computer, writing data to the computer object, and using the computer object to determine whether the patch is compatible with the installed components of the computer on the network is performed for computer objects on the network administrator system.

12. The method of claim 11, further comprising:
maintaining a plurality of patches at the network administrator system, wherein determining the stares defined by the realizations, writing data to the computer object, and using the computer objects to determine whether the patch is compatible with the installed components of the computers on the network is performed for each patch available to the network administrator system.

13. The method of claim 12, further comprising:
generating a list of all patches determined to be compatible with the installed components of the computers on the network, and
rendering the list of patches on an output device to enable a user of the network administrator system to select the content of one or more of the patches on the list to install on one or more of the computers in the network.

14. The method of claim 1, wherein the content comprises a fix, and wherein the state defined by the realization is capable of indicating whether the computer is susceptible to a bug corrected by the fix.

15. The method of claim 1, wherein determining the at least one of installed hardware and software components comprises:
executing a detector program on the computer to process files in the computer to determine installed hardware and software components on the computer.

16. The method of claim 15, wherein determining the at least one of installed hardware and software components comprises:
receiving user input indicating installed hardware and software components on the computer.

17. The method of claim 16, wherein the user input is received by:
displaying a user interface presenting user selectable software and hardware components; and
receiving user selection of software and hardware components from the displayed user interface, wherein the received user input indicating the installed hardware and software components comprises the components selected from the user interface.

18. The method of claim 1, wherein reading and writing performed as part of adding content to the computer is restricted to the computer object on the computer.

19. A system for applying a patch, wherein the patch includes content to add, comprising:
means for determining at least one of installed hardware and software components on the computer;
means for generating a computer object including configuration information on the determined installed components;
means for providing at least one patch including content to add to the computer, wherein each patch is capable of being associated with at least one realization, wherein each realization defines a state of the computer;
means for determining from the configuration information in the computer object for each realization whether the state defined by the realization exists in the computer, said means including the downloading of a realization detector used to check for the presence of at least one realization;
means for writing data to the computer object indicating whether the state defined by the realization exists on the computer; and means for using the computer object to determine whether each patch is compatible with the installed components of the computer.

20. The system of claim 19, wherein the patch content to add to the computer is capable of comprising one of: a new program; an upgrade to an installed program; a fix to an installed program; and documentation.

21. The system of claim 19, wherein one realization is capable of being dependent on another realization in the computer object, further comprising:
means for determining whether the realization is dependent on at least one base realization; and
means for performing, if the realization is dependent on at least one base realization:
(i) determining whether the computer object includes information on the base realizations; and (ii) if the computer object does not include information on the base realizations, then throwing an exception.

22. The system of claim 21, further comprising:
means for preventing each patch associated with at least one realization dependent from the base realization not written to the computer object from being installed in response to throwing the exception.

23. The system of claim 19, wherein the means for writing data to the computer object indicating that the state exists further performs:
indicating in the computer object that the sate defined by the realization exists in the computer if the state exists on the computer; and indicating in the computer object that the state defined by the realization does not exist on the computer if the state does not exist on the computer.

24. The system of claim 19, wherein the means for determining from the computer object whether the state exists on the computer further performs determining whether information on one previously considered realization is written to the computer object.

25. The system of claim 19, wherein each patch is further associated with a patch expression, further comprising means for processing the patch and the computer object to determine whether to add the content from the patch onto the computer.

26. The system of claim 19 wherein each realization detector includes detector code to determining whether states defined by realizations exist in the computer and to write data to the computer object concerning the existence of the determined states.

27. The system of claim 19, further comprising:
means for downloading a plurality of patches to the computer, each including content to add to the computer, wherein the means for executing a realization routine, writing data to the computer object, and using the computer object to determine whether the patch is compatible with the installed components of the computer is performed in the computer.

28. The system of claim 27, further comprising:
means for generating a list of all patches determined to be compatible with the installed components of the computer; and means for rendering the list of patches on an output device to enable a user to select the content of one or more of the patches on the list to add to the computer.

29. The system of claim 19, further comprising:
means for maintaining a plurality of computer objects associated with a plurality of computers on a network, wherein each computer object includes the configuration information on the determined installed components of one computer on the network.

30. The system of claim 29, further comprising:
means for maintaining a plurality of patches, wherein determining the states defined by the realizations, writing data to the computer object, and using the computer objects to determine whether the patch is compatible with the installed components of the computers on the network is performed for each patch available to the network administrator system.

31. The system of claim 30, further comprising:
means for generating a list of all patches determined to be compatible with the installed components of the computers on the network; and
means for rendering the list of patches on an output device to enable a user of a network administrator system to select the content of one or more of the patches on the list to install on one or more of the computers in the network.

32. The system of claim 19, wherein the content comprises a fix, and wherein the state defined by the realization is capable of indicating whether the computer is susceptible to a bug corrected by the fix.

33. The system of claim 19, wherein the means for determining the at least one of installed hardware and software components performs:
executing a detector program on the computer to process files in the computer to determine installed hardware and software components on the computer.

34. The system of claim 33, wherein the means for determining the at least one of installed hardware and software components performs:
receiving user input indicating installed hardware and software components on the computer.

35. The system of claim 34, further comprising:
means for displaying a user interface presenting user selectable software and hardware components; and
means for receiving user selection of software and hardware components from the displayed user interface, wherein the received user input indicating the installed hardware and software components comprises the components selected from the user interface.

36. The system of claim 19, wherein the means for reading and writing performed as part of adding content to the computer is restricted to the computer object on the computer.

37. An article of manufacture for applying a patch to a computer system, wherein the patch includes content to add to the computer, by:
determining at least one of installed hardware and software components on the computer;
generating a computer object including configuration information on the determined installed components;
providing at least one patch including content to add to the computer, wherein each patch is capable of being associated with at least one realization, wherein each realization defines a state of the computer;
for each realization, downloading a realization detector to the computer system, each realization detector determining from the configuration information in the computer object whether the state defined by the realization exists in the computer;
writing data to the computer object indicating whether the state defined by the realization exists on the computer; and
using the computer object to determine whether each patch is compatible with the installed components of the computer.

38. The article of manufacture of claim 37, wherein the patch content to add to the computer is capable of comprising one of: a new program; an upgrade to an installed program; a fix to an installed program; and documentation.

39. The article of manufacture of claim 37, wherein one realization is capable of being dependent on another realization in the computer object, further comprising:
determining whether the realization is dependent on at least one base realization; and
if the realization is dependent on at least one base realization, performing:
(i) determining whether the computer object includes information on the base realization; and
(ii) if the computer object does not include information on the base realizations, then throwing an exception.

40. The article of manufacture of claim 39, further comprising:

in response to throwing the exception, preventing each patch associated with at least one realization dependent from the base realization not written to the computer object from being installed.

41. The article of manufacture of claim 37, wherein writing data to the computer object indicating that the state exists comprises:
   indicating in the computer object that the state defined by the realization exists in the computer if the state exists on the computer; and
   indicating in the computer object that the state defined by the realization does not exist on the computer if the state does not exist on the computer.

42. The article of manufacture of claim 37, wherein determining from the computer object whether the state exists on the computer includes determining whether information on one previously considered realization is written to the computer object.

43. The article of manufacture of claim 37, wherein each patch is further associated with a patch expression that is capable of processing the computer object to determine whether to add the content from the patch onto the computer.

44. The article of manufacture of claim 37 wherein each realization detector includes detector code to determine whether states defined by realization exist on the computer and to write data to the computer object concerning the existence of the determined states.

45. The article of manufacture of claim 37, further comprising:
   downloading a plurality of patches to the computer, each including content to add to the computer, wherein the steps of executing a realization routine, writing data to the computer object, and using the computer object to determine whether the patch is compatible with the installed components of the computer is performed on the computer.

46. The article of manufacture of claim 45, further comprising:
   generating a list of all patches determined to be compatible with the installed components of the computer; and
   rendering the list of patches on an output device to enable a user to select the content of one or more of the patches on the list to add to the computer.

47. The article of manufacture of claim 37, further comprising:
   maintaining, at a network administrator system, a plurality of computer objects associated with a plurality of computers on a network, wherein each computer object includes the configuration information on the determined installed components of one computer on the network, and wherein the steps of determining whether the state defined by the realization exists on the computer, writing data to the computer object, and using the computer object to determine whether the patch is compatible with the installed components of the computer on the network is performed for computer objects on the network administrator system.

48. The article of manufacture of claim 47, further comprising:
   maintaining a plurality of patches at the network administrator system, wherein determining the states defined by the realizations, writing data to the computer object, and using the computer objects to determine whether the patch is compatible with the installed components of the computers on the network is performed for each patch available to the network administrator system.

49. The article of manufacture of claim 48, further comprising:
   generating a list of all patches determined to be compatible with the installed components of the computers on the network; and
   rendering the last of patches on an output device to enable a user of the network administrator system to select the content of one or more of the patches on the list to install on one or more of the computers in the network.

50. The article of manufacture of claim 37, wherein the content comprises a fix, and wherein the state defined by the realization is capable of indicating whether the computer is susceptible to a bug corrected by the fix.

51. The article of manufacture of claim 37, wherein determining the at least one of installed hardware and software components comprises:
   executing a detector program on the computer to process files in the computer to determine installed hardware and software components on the computer.

52. The article of manufacture of claim 51, wherein determining the at least one of installed hardware and software components comprises:
   receiving user input indicating installed hardware and software components on the computer.

53. The article of manufacture of claim 52, wherein the user input is received by:
   displaying a user interface presenting user selectable software and hardware components; and
   receiving user selection of software and hardware components from the displayed user interface, wherein the received user input indicating the installed hardware and software components comprises the components selected from the user interface.

54. The article of manufacture of claim 37, wherein reading and writing performed as part of adding content to the computer is restricted to the computer object on the computer.

55. A computer readable medium including data structures used for applying a patch to a computer system, wherein the patch includes content to add to the computer, comprising:
   a computer object including configuration information on installed hardware and software components in the computer;
   a realization object including an association of at least one patch including content to add to the computer and at least one realization, wherein each realization defines a state of the computer, wherein a realization detector is downloaded to the computer system for each realization and uses the configuration information in the computer object to determine whether the state defined by the realization lists in the computer, wherein data is written to the computer object indicating whether the state defined by the realization exists on the computer, and wherein the computer object is used to determine whether each patch is compatible with the installed components of the computer.

56. The computer readable medium of claim 55, further comprising:
   a patch expression set including code that when executed processes the computer object to determine whether to add the content from the patch onto the computer.

57. The computer readable medium of claim 55, further comprising:
   a realization detector object including detector code to determine whether states defined by at least one realization exists on the computer and to write data to the computer object concerning the existence of the determined states.

58. The computer readable medium of claim 55, further comprising:
a plurality of computer objects associated with a plurality of computers on a network, wherein each computer object includes the configuration information on the determined installed components of one computer on the network, and wherein the determination of whether the state defined by the realization exists on the computer, writing data to the computer object, and using the computer object to determine whether the patch is compatible with the installed components of the computer on the network is performed for computer objects on a network administrator system.

* * * * *